(12) United States Patent
Abramson et al.

(10) Patent No.: US 12,026,713 B2
(45) Date of Patent: *Jul. 2, 2024

(54) SYSTEM AND METHOD FOR PROCESSING TRANSACTIONS

(71) Applicants: Michael T. Abramson, Guilford, CT (US); J. Mitchell Herbert, Jr., Fairfax, VA (US)

(72) Inventors: Michael T. Abramson, Guilford, CT (US); J. Mitchell Herbert, Jr., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,591

(22) Filed: Mar. 29, 2022

(65) Prior Publication Data

US 2022/0222669 A1 Jul. 14, 2022

Related U.S. Application Data

(63) Continuation of application No. 16/422,624, filed on May 24, 2019, now Pat. No. 11,288,671, which is a continuation of application No. 14/230,481, filed on Mar. 31, 2014, now Pat. No. 10,304,058, which is a continuation of application No. 13/736,579, filed on Jan. 8, 2013, now Pat. No. 8,688,592.

(51) Int. Cl.
| | |
|---|---|
| *G06Q 20/00* | (2012.01) |
| *G06F 21/31* | (2013.01) |
| *G06Q 20/10* | (2012.01) |
| *G06Q 20/32* | (2012.01) |
| *G06Q 20/40* | (2012.01) |

(52) U.S. Cl.
CPC ......... *G06Q 20/4014* (2013.01); *G06F 21/31* (2013.01); *G06Q 20/10* (2013.01); *G06Q 20/3274* (2013.01); *G06Q 2220/123* (2013.01)

(58) Field of Classification Search
CPC ............... G06Q 20/4014; G06Q 20/10; G06Q 20/3274; G06Q 2220/123; G06Q 20/306; G06F 21/31
USPC .................. 705/16, 21, 59; 380/44, 262, 278
See application file for complete search history.

(56) References Cited

U.S. PATENT DOCUMENTS 6,366,220 B1 * 4/2002 Elliott .................. G06Q 10/087
340/5.1

FOREIGN PATENT DOCUMENTS

| EP | 1548630 A2 * | 6/2005 | ........... G06Q 10/087 |
| EP | 2001047 A1 * | 12/2008 | ............. H01L 21/56 |

OTHER PUBLICATIONS

Ohtani Ref. (Year: 2008).*
Sato Ref (Year: 2004).*

* cited by examiner

*Primary Examiner* — Dante Ravetti
(74) *Attorney, Agent, or Firm* — BEHMKE INNOVATION GROUP LLC; James M. Behmke; Keith O. Mitchell

(57) ABSTRACT

A method, computer program product, and computer system for receiving a first scan of an identifier from a first computing device is disclosed. The identifier is associated with a financial transaction. A second scan of the identifier is received from a second computing device. The financial transaction is processed based upon, at least in part, receiving the second scan of the identifier from the second computing device.

20 Claims, 7 Drawing Sheets

SYSTEM AND METHOD FOR PROCESSING TRANSACTIONS

RELATED APPLICATIONS

This application is a continuation of U.S. patent application Ser. No. 16/422,624 filed on 24 May 2019, now U.S. Pat. No. 11,288,671, which is a continuation of U.S. patent application Ser. No. 14/230,481 filed on 31 Mar. 2014, now U.S. Pat. No. 10,304,058, which is a continuation application of U.S. patent application Ser. No. 13/736,579, filed on 8 Jan. 2013, now U.S. Pat. No. 8,688,592, the entire contents of which are herein incorporated by reference.

TECHNICAL FIELD

This disclosure relates to electronic transactions systems and, more particularly, to methods and systems for processing transactions in more efficient and/or convenient manners.

BACKGROUND

When performing a transaction (e.g., a financial transaction such as those used to effectuate the purchase of an item), currency, checks, credit cards, and the like often may be used to facilitate the transaction. The efficiency or convenience of using any one of these forms of rendering payment may be limited in certain situations.

BRIEF SUMMARY OF DISCLOSURE

In one implementation, a method, performed by one or more computing devices, comprises receiving a first scan of an identifier from a first computing device. The identifier is associated with a financial transaction. A second scan of the identifier is received from a second computing device. The financial transaction is processed based upon, at least in part, receiving the second scan of the identifier from the second computing device.

One or more of the following features may be included. Processing the financial transaction may include purchasing one or more items. Processing the financial transaction may include transferring an asset from a first location to a second location. Validity of the financial transaction may be authenticated. Authenticating validity of the financial transaction may include verifying whether the first scan of the identifier matches the second scan of the identifier. Authenticating validity of the financial transaction may include sending a notification to a user identifying the financial transaction. Authenticating validity of the financial transaction may include receiving a user-based confirmation. The identifier may include at least one of a signature and an image. The image may include a code. The code may include at least one of a bar code and a QR code.

In another implementation, a computing system includes a processor and a memory configured to perform operations comprising receiving a first scan of an identifier. The identifier is associated with a financial transaction. A second scan of the identifier is received. The financial transaction is initiated based upon, at least in part, receiving the second scan of the identifier.

One or more of the following features may be included. Processing the financial transaction may include purchasing one or more items. Processing the financial transaction may include transferring an asset from a first location to a second location. Validity of the financial transaction may be authenticated. Authenticating validity of the financial transaction may include verifying whether the first scan of the identifier matches the second scan of the identifier. Authenticating validity of the financial transaction may include sending a notification to a user identifying the financial transaction. Authenticating validity of the financial transaction may include receiving a user-based confirmation. The identifier may include at least one of a signature and an image. The image may include a code. The code may include at least one of a bar code and a QR code.

In another implementation, a computer program product resides on a computer readable storage medium that has a plurality of instructions stored on it. When executed by a processor, the instructions cause the processor to perform operations comprising receiving a first scan of an identifier. The identifier is associated with a financial transaction. A second scan of the identifier is received. The financial transaction is initiated based upon, at least in part, receiving the second scan of the identifier.

One or more of the following features may be included. Processing the financial transaction may include purchasing one or more items. Processing the financial transaction may include transferring an asset from a first location to a second location. Validity of the financial transaction may be authenticated. Authenticating validity of the financial transaction may include verifying whether the first scan of the identifier matches the second scan of the identifier. Authenticating validity of the financial transaction may include sending a notification to a user identifying the financial transaction. Authenticating validity of the financial transaction may include receiving a user-based confirmation. The identifier may include at least one of a signature and an image. The image may include a code. The code may include at least one of a bar code and a QR code.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview

Figure 1:
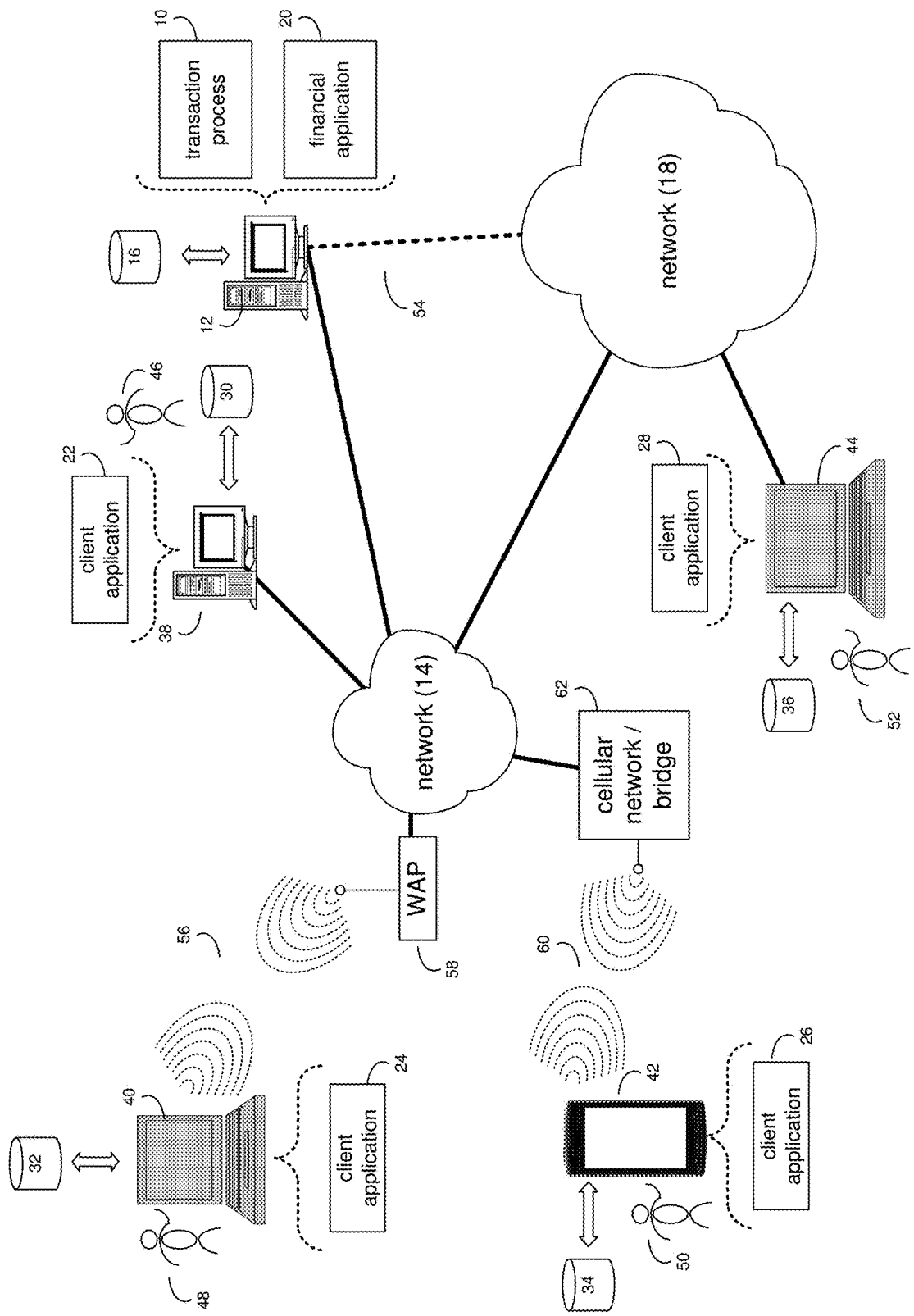
FIG. 1 is an illustrative diagrammatic view of a transaction process coupled to a distributed computing network according to one or more implementations of the present disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave (though this is not a requirement of the present disclosure and it need not be included). Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown transaction process 10 that may reside on and may be executed by a computer (e.g., computer 12), which may be connected to a network (e.g., network 14) (e.g., the internet or a local area network). Examples of computer 12 (and/or one or more of the client applications noted below) may include, but are not limited to, a personal computer(s), a laptop computer(s), an automated teller machine(s) (ATM), vending machine(s), mobile computing device(s), a server computer, a series of server computers, a mainframe computer(s), or a computing cloud(s). Computer 12 may execute an operating system, for example, but not limited to, Microsoft® Windows® Mac® OS X®; Red Hat® Linux®, or a custom operating system. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, transaction process 10 may receive a first scan of an identifier from a first computing device. The identifier may be associated with a financial transaction. A second scan of the identifier may be received from a second computing device. The financial transaction may be initiated based upon, at least in part, receiving the second scan of the identifier from the second computing device.

The instruction sets and subroutines of transaction process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store (not shown), such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Transaction process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute one or more financial applications (e.g., financial application 20), examples of which may include, but are not limited to, e.g., a financial institution application, a financial processing application, an authentication application, an e-commerce application, an acquirer application, or other application that allows payment and/or asset (e.g., money) transfers to be effectuated, e.g., through the Internet or otherwise.

Transaction process 10 and/or financial application 20 may be accessed via, e.g., client applications 22, 24, 26, 28. Transaction process 10, financial application 20, one or more of client applications 22, 24, 26, 28, or a combination thereof, may be, e.g., a stand alone application, or may be an applet/application/script that may interact with and/or be executed within transaction process 10, financial application 20, one or more of client applications 22, 24, 26, 28, or a combination thereof. Examples of client applications 22, 24, 26, 28 may include, but are not limited to, e.g., a financial institution application, a financial processing application, an authentication application, an e-commerce application, an acquirer application, or other application that allows payment and/or asset (e.g., money) transfers to be effectuated, e.g., through the Internet or otherwise, a scanning application, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; solid-state drives (SSDs), flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a checkout register, an automated teller machine (ATM; not shown), a vending machine, a scanner (e.g., code scanner, image scanner, etc.), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of transaction process 10 (and vice versa). Accordingly, transaction process 10 may be a purely server-side application, a purely client-side application, or a hybrid server-side/client-side application that is cooperatively executed by one or more of client applications 22, 24, 26, 28 and/or transaction process 10.

One or more of client applications 22, 24, 26, 28 may be configured to effectuate some or all of the functionality of financial application 20 (and vice versa). Accordingly, financial application 20 may be a purely server-side application, a purely client-side application, or a hybrid server-side/client-side application that is cooperatively executed by one or more of client applications 22, 24, 26, 28 and/or financial application 20. As one or more of client applications 22, 24, 26, 28, transaction process 10, and financial application 20, taken singly or in any combination, may effectuate some or all of the same functionality, any description of effectuating such functionality via one or more of client applications 22, 24, 26, 28, transaction process 10, financial application 20, or combination thereof, and any described interaction(s) between one or more of client applications 22, 24, 26, 28, transaction process 10, financial application 20, or combination thereof to effectuate such functionality, should be taken as an example only and not as a limitation of this disclosure.

Users 46, 48, 50, 52 may access computer 12 and transaction process 10 directly through network 14 and/or through secondary network 18. Further, computer 12 may be connected to network 14 through secondary network 18, as illustrated with phantom link line 54. Transaction process 10 may include one or more user interfaces, such as browsers and textual or graphical user interfaces, through which users 46, 48, 50, 52 may access transaction process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
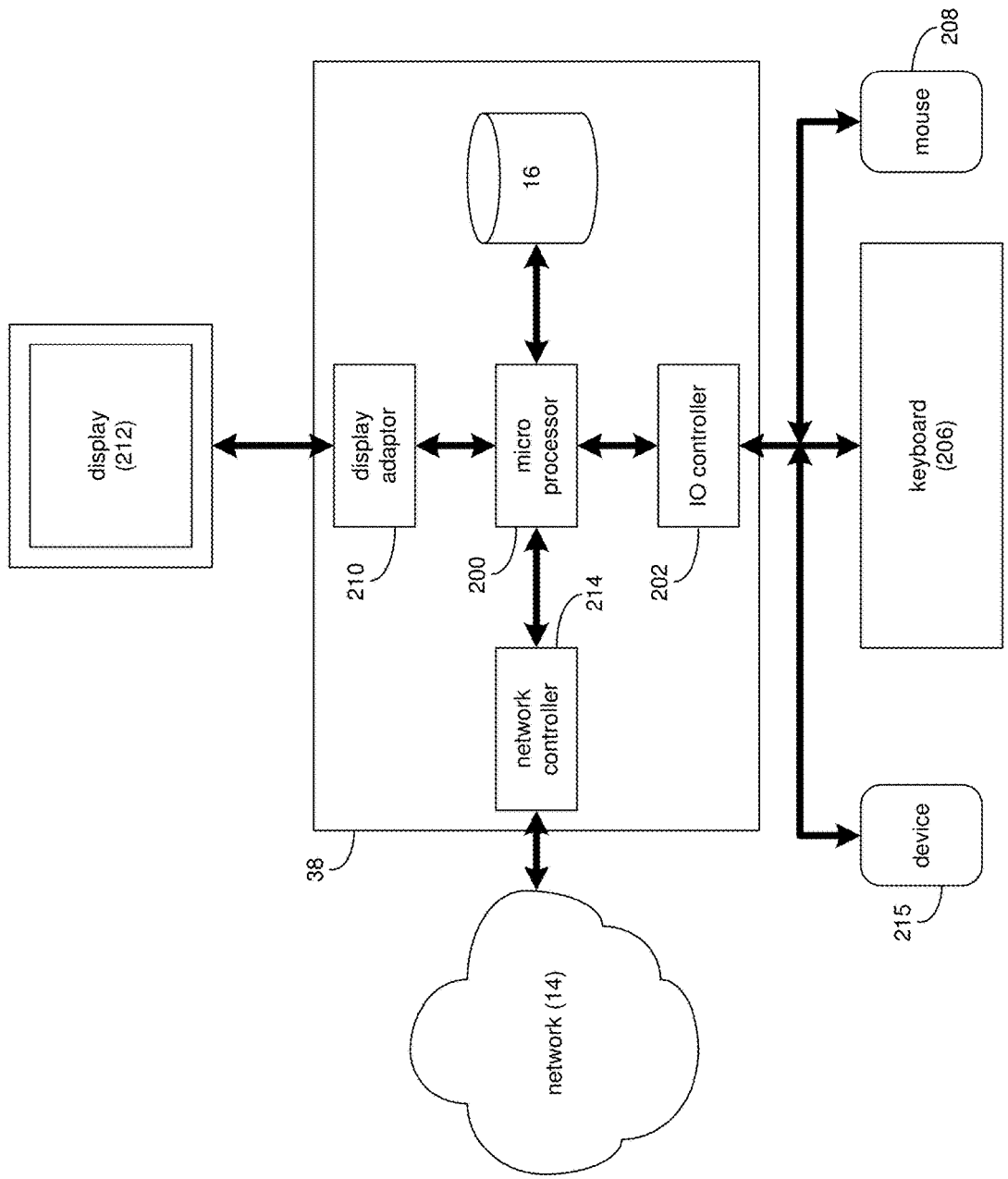
FIG. 2 is a diagrammatic view of a client electronic device of FIG. 1 according to one or more implementations of the present disclosure.
Figure 3:
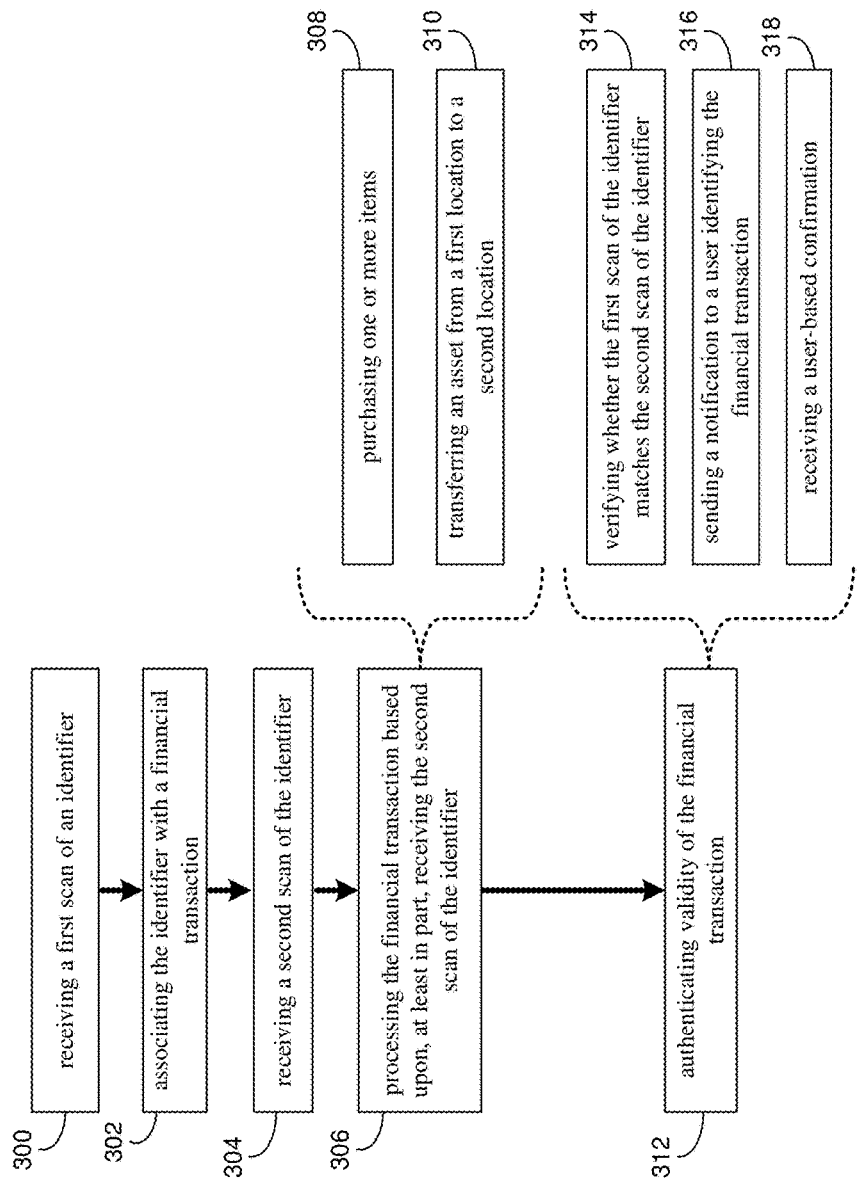
FIG. 3 is an illustrative flowchart of the transaction process of FIG. 1 according to one or more implementations of the present disclosure.
Figure 4:
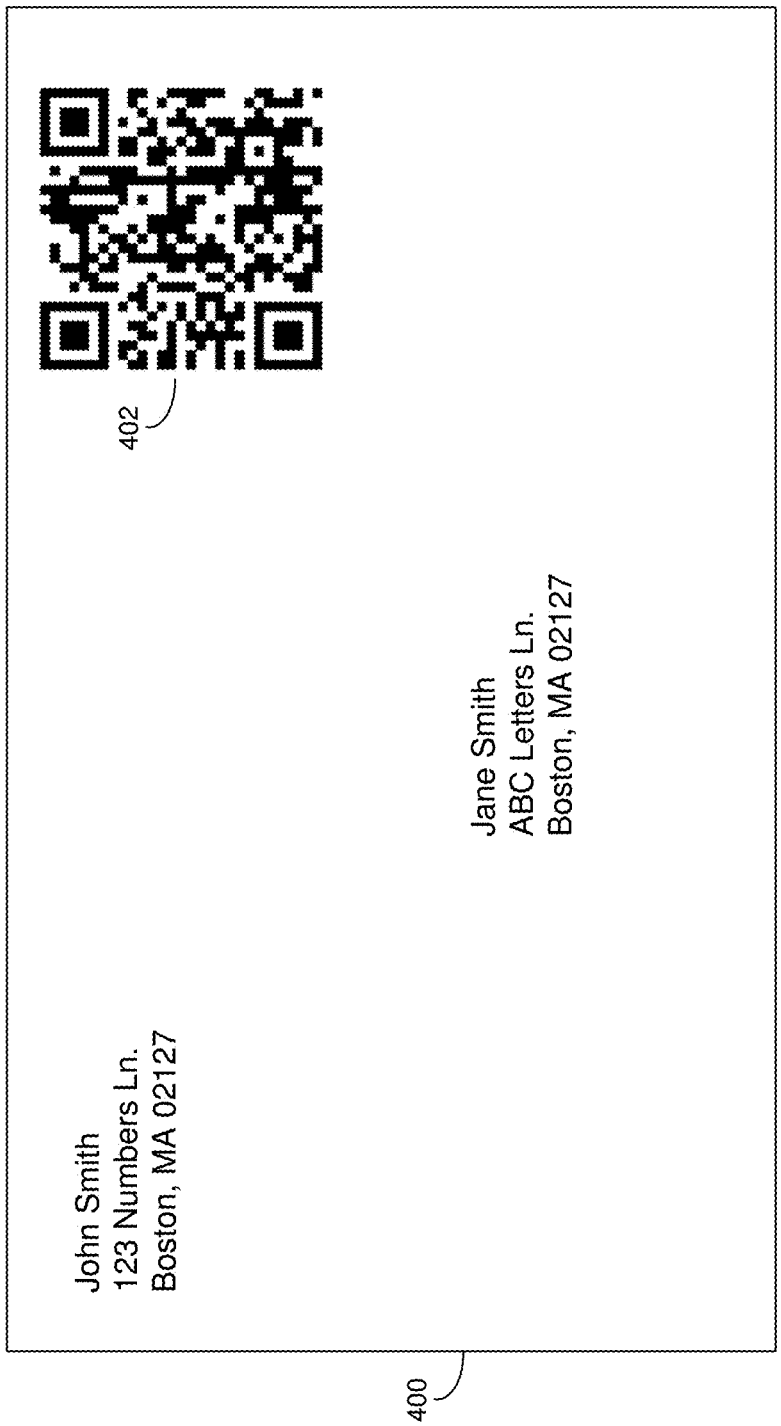
FIG. 4 is an illustrative diagrammatic view of an envelope according to one or more implementations of the present disclosure.
Figure 5:
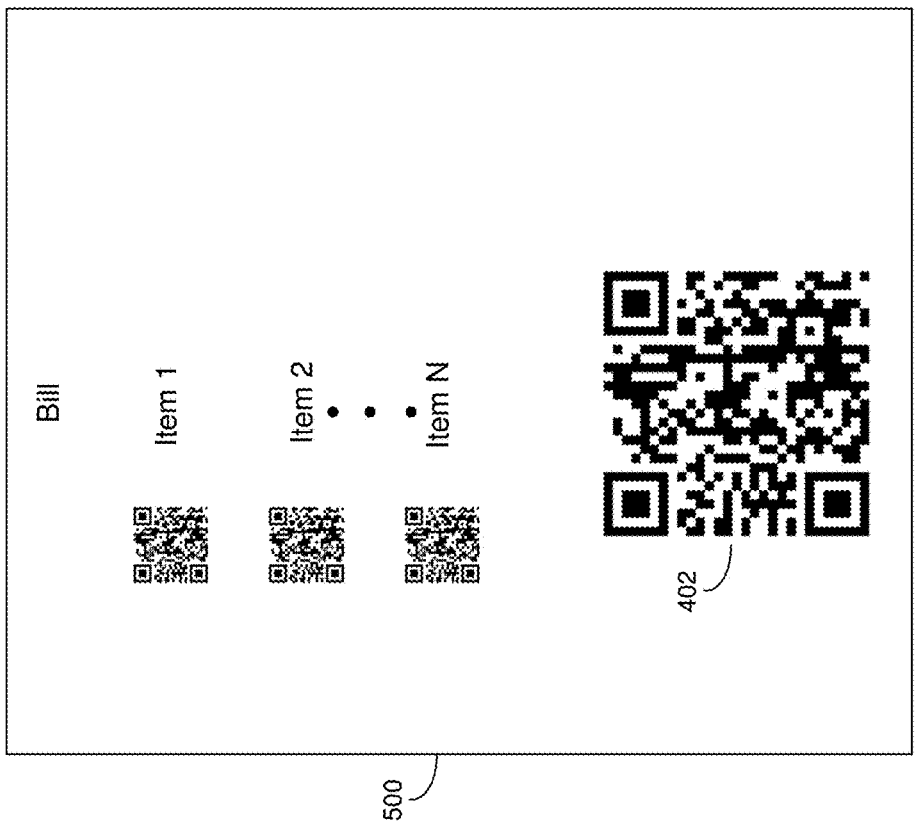
FIG. 5 is an illustrative diagrammatic view of a bill according to one or more implementations of the present disclosure.
Figure 6:
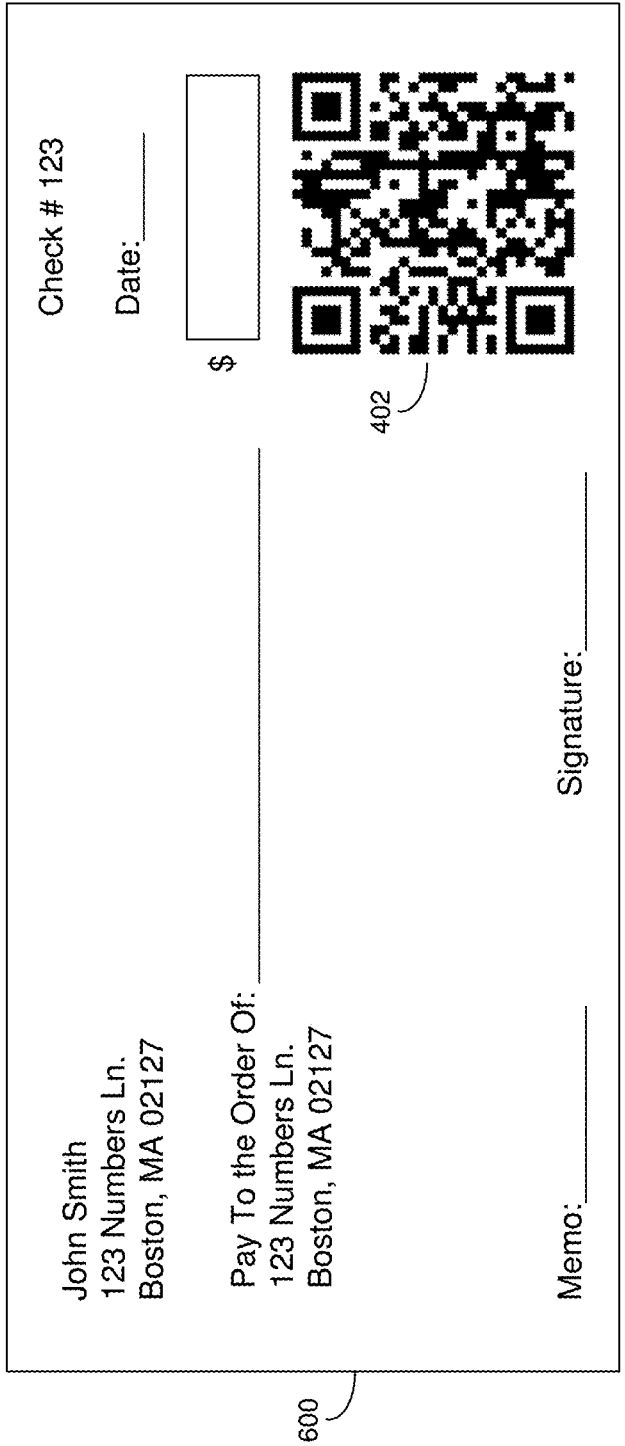
FIG. 6 is an illustrative diagrammatic view of a check according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, transaction process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (e.g., scanner 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-7, transaction process 10 may receive 300 a first scan of an identifier from a first computing device. The identifier may be associated 302 with a financial transaction by transaction process 10. A second scan of the identifier may be received 304 by transaction process 10 from a second computing device. The financial transaction may be processed 306 by transaction process 10 based upon, at least in part, receiving 304 the second scan of the identifier from the second computing device.

For instance, assume for example purposes only that a user (e.g., user 50) desires to mail a letter and places the letter in an envelope (e.g., envelope 400) or other type of suitable packaging. In this example, envelope 400 may include an identifier (e.g., identifier 402). In some implementations, the identifier may include at least one of a signature (e.g., handwritten or otherwise) and an image. In some implementations, the image may include a code. The code may include at least one of a bar code and a QR Code®. QR code is a registered trademark of Denso Wave Inc. in the United States, other countries or both. QR code may include a micro QR code. Other examples of signatures, images, codes (e.g., single or multi-dimensional), number/letter combinations, or any other identifiers may also be used without departing from the scope of this disclosure.

In some implementations, identifier 402 may be printed on envelope 400, e.g., by user 50 inserting envelope 400 into a printer, and/or may be pre-printed on envelope 400, e.g., by a manufacturer of envelope 400. In some implementations, identifier 402 may be printed separately and subsequently combined with envelope 400. For example, identifier 402 may include, e.g., an adhesive to enable identifier 402 to be affixed to envelope 400. Other techniques of combining identifier 402 with envelope 400 may also be used without departing from the scope of this disclosure.

In this example, and in some implementations, transaction process 10 (e.g., via client application 26, financial application 20, or combination thereof) may receive 300 a first scan of an identifier (e.g., identifier 402) from, e.g., a first computing device (e.g., client electronic device 42). For instance, assume for example purposes only that client electronic device 42 includes, e.g., a camera, scanner, or other image capturing capabilities. User 50 may utilize the scanner (e.g., via client application 26) of client electronic device 42 to capture identifier 402. In some implementations, the captured identifier 402 may be sent from client electronic device 42 to be received 300 by transaction process 10 (and/or financial application 20) at, e.g., another computing device (e.g., computer 12).

In some implementations, transaction process 10 may associate 302 identifier 402 with a financial transaction. For instance, assume for example purposes only that identifier 402 is used, e.g., to facilitate payment of at least a portion of the cost of mailing envelope 400. In this example, transaction process 10 may associate 302 (e.g., correlate, link, tie, relate, etc.) identifier 402 with the financial transaction of paying for the cost of mailing envelope 400 (e.g., based upon, at least in part, receiving 300 the first scan of identifier 402), by accessing, e.g., the data store described above that may contain information to effectuate the financial transaction, as discussed below.

In some implementations, associating 302 identifier 402 with the financial transaction may include associating 302 identifier 402 with an account of a financial institution (e.g., bank) of, e.g., user 50. For example, transaction process 10 may associate 302 identifier 402 with a savings/checking account of user 50.

In some implementations, associating 302 identifier 402 with the financial transaction may include associating 302 identifier 402 with user 50. For example, identifier 402 may be uniquely (e.g., exclusively) associated 302 with user 50

(and/or a business entity), similar to a credit card number, bank account number, utility account number, etc. This is not intended to be a limitation of this disclosure, as other implementations may be utilized.

For example, identifier 402 may be uniquely associated 302 with user 50, e.g., permanently, and/or for a duration of time (e.g., seconds, minutes, days, etc.), and/or until another user (e.g., user 52) scans (and/or transaction process 10 receives) identifier 402 before the above-noted financial transaction has been processed 306 or completed. In the latter example, this may have the effect of negating or otherwise removing the association 302 of identifier 402 with user 50 for the financial transaction, and instead associating 302 identifier 402 with user 52 for the financial transaction (or adding the association 302 of identifier 402 with user 52 for the financial transaction as similarly discussed above with the financial transaction of user 50 for the financial transaction).

Additionally/alternatively, identifier 402 may be uniquely associated 302 with user 50 until user 50 scans (and/or transaction process 10 receives) identifier 402 a second time from user 50 (again) before the above-noted financial transaction has been processed 306 or completed (or until the above-noted financial transaction has been processed 306 or completed), at which time identifier 402 may be "freed" (e.g., made available) to be uniquely associated 302 with a different user (e.g., user 52).

Figure 7:
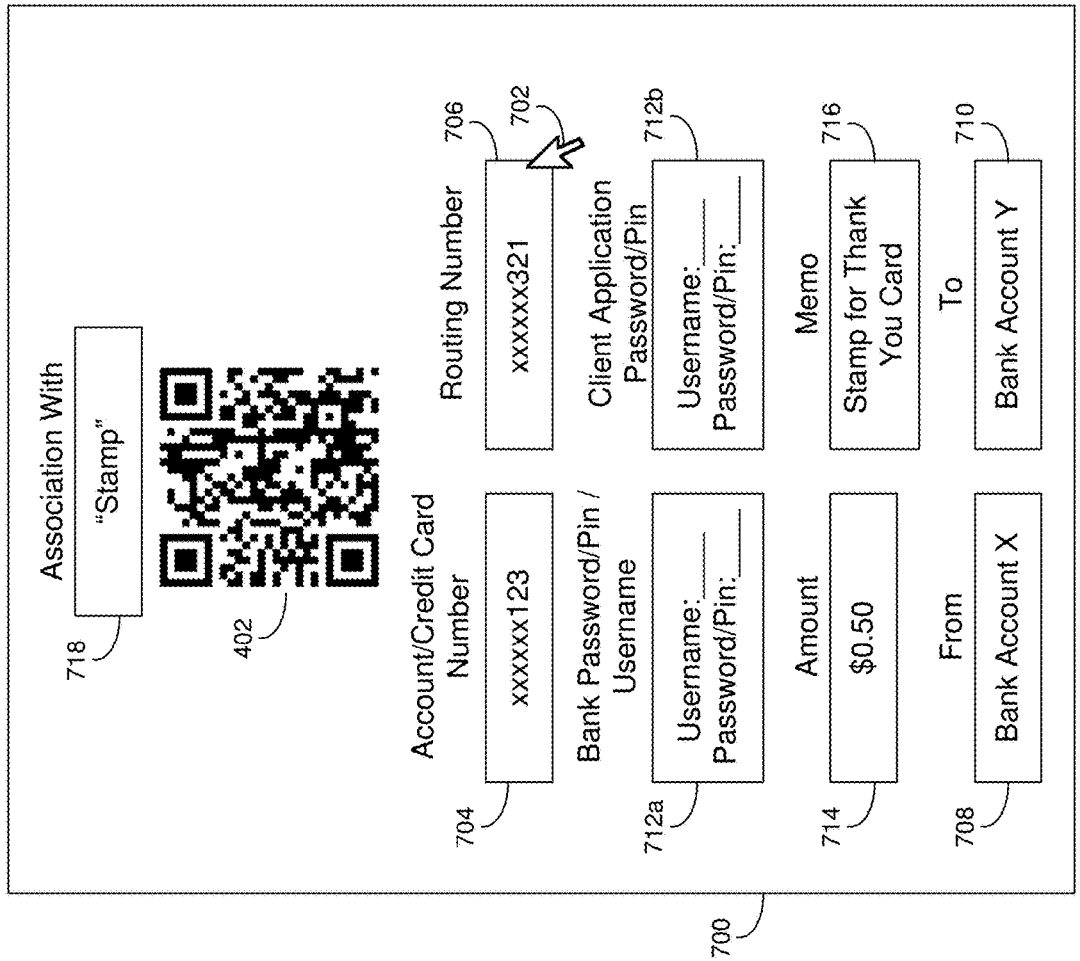
FIG. 7 is an illustrative diagrammatic view of a screen image displayed by the transaction process of FIG. 1 according to one or more implementations of the present disclosure.

In some implementations, information regarding the financial transaction may be employed. This includes, but is not limited to, account number 704; routing number 706; financial institution name from which the cost of mailing envelope 400 is transferred 708 for the financial transaction; financial institution name to which the cost of mailing envelope 400 is transferred 710 for the financial transaction; financial institution account username/password/pin 712a (e.g., credentials for accessing one or more of the above-noted financial institutions via client application 26, transaction process 10, financial application 20, or a combination thereof); client application account username/password(s)/pin 712b (e.g., credentials for accessing one or more of the above-noted financial institutions via client application 26, transaction process 10, financial application 20, or a combination thereof); amount of money to transfer 714; and a memo describing the financial transaction 716. Such information (e.g., pertaining to the financial institution) may be used for the association 302 and may be provided (e.g., manually) by user 50 (e.g., via an example user interface 700 of client application 26 and pointer 702, as shown in FIG. 7) and/or automatically (e.g., via client application 26, transaction process 10, financial application 20, or a combination thereof), e.g., in response to user interface 700 being provided with relevant access credentials.

For example, by providing transaction process 10 with the credentials that may be used to log into an online account of the financial institution (e.g., financial institution username for user 50, financial institution password for user 50, etc.), the above-noted information may be accessed by transaction process 10. In some implementations, user interface 700 may enable user 50 to provide a nickname (e.g., nickname "Stamp" 718) for identifier 402, e.g., to distinguish it from other identifiers (not shown).

In some implementations, transaction process 10 may receive 304 (e.g., via a second computing device such as computer 12) a second scan of identifier 402. For instance, assume for example purposes only that user 50 has mailed envelope 400 and that envelope 400 has been received by, e.g., the post office or other courier. The post office may scan identifier 402 (e.g., from envelope 400) that may, in turn, be received 304 by transaction process 10. In some implementations, the second scan of identifier 402 may occur at any point in time. For example, the second scan of identifier 402 may occur when envelope 400 is received at a mailbox receptacle, when envelope 400 is received by the mail person for the first time, when envelope 400 is being processed at a local post office, when envelope 400 is delivered to the appropriate address (e.g., when signing for receipt of envelope 400 and/or confirming delivery of envelope 400), or any other time.

In some implementations, transaction process 10 may process 306 the financial transaction based upon, at least in part, receiving 304 the second scan of identifier 402 (e.g., via computer 12). The term "process" (or "processing") may imply a specific first action taken to process the financial transaction (e.g., initiating a transaction), continued processing of the financial transaction, and/or completing the financial transaction. For example, processing 306 the financial transaction may include purchasing 308 (e.g., via transaction process 10, financial application 20, client application 26, or a combination thereof) one or more items. For instance, the one or more items may include the cost of mailing envelope 400. Other items and/or services may also be purchased without departing from the scope of this disclosure.

Other examples of processing 306 may also be implemented without departing from the scope of this disclosure. For example, processing 306 the financial transaction may include transaction process 10 (e.g., via financial application 20, client application 26, or combination thereof) transferring 310 an asset (e.g., currency, title, stock, etc.) from a first location to a second location. For instance, assume for example purposes only that when the post office scans identifier 402 (and/or identifier 402 is received 304 by transaction process 10), the cost of mailing envelope 400 (e.g., $0.50) may be transferred 310 from, e.g., an account of a financial institution of user 50 (e.g., the first location, or the source), to an account of a financial institution (e.g., bank) of the post office (e.g., the second location, or the target).

In some implementations, the cost of mailing envelope 400 may have already been transferred 310 from the account of user 50 to, e.g., an acquirer account, an escrow account, a holding account, intermediate account, etc. This may occur, e.g., in response to transaction process 10 receiving 300 the first scan of identifier 402, and/or user 50 "prepaying" for a future financial transaction before it occurs, and/or if a minimum threshold balance for any of the above-noted accounts is required, as well as in response to other situations. For instance, the first scan and the second scan may be the same scan (e.g., only one scan may actually be captured), such that transaction process 10 may process 306 the financial transaction based upon, at least in part, receiving 300/304 either the first scan of identifier 402 and/or the second scan of identifier 402. In this example, when the post office scans identifier 402 (and/or identifier 402 is received 304 by transaction process 10), the cost of mailing envelope 400 (e.g., $0.50) may be transferred 310 from, e.g., the acquirer account, to the account of the financial institution of the post office. As such, the acquirer account may be considered the first location (or the source) and the second location (or the target) as appropriate.

Continuing with the above-recited example, the cost of mailing envelope 400 (e.g., $0.50) may be transferred 310 from, e.g., a credit card (or debit card) account of the financial institution of user 50. In some implementations, if $0.50 is more money than is needed to mail envelope 400

(e.g., user 50 has paid too much to mail envelope 400), at least a portion of the refund of the excess cost may be provided to any of the above-noted accounts (e.g., back to the account of the financial institution of user 50, acquirer account, etc.).

In some implementations, some or all of the refund may be transferred 310 to another account (e.g., charity, company, friend/family, etc.) that may be designated, e.g., via transaction process 10. For example, a company associated with, e.g., transaction process 10, may, in exchange for refunding at least a portion of the excess cost that might not normally be identified and refunded, charge a "finder fee" of, e.g., 10% of the refunded cost and/or a flat fee of, e.g., $0.10 per refund.

In some implementations, user 50 may provide identifier 402 to another user (e.g., user 52). For instance, assume for example purposes only that user 50 has forgotten a set of expensive headphones at the home of user 52, and user 50 has asked user 52 to mail the headphones back to user 50. In this example, rather than requiring user 52 to pay for the cost of mailing the headphones, user 50 (e.g., via client application 26 and/or transaction process 10) may send (e.g., email, text, etc.) identifier 402 to user 52 for use when mailing the headphones. In this manner, transaction process 10 may receive 300 the first scan of identifier 402, which may include transaction process 10 generating identifier 402. Thus, in some implementations, receiving 300 the first scan may include the generation of identifier 402 and/or the capturing of identifier 402 via a scan of identifier 402.

Additionally, upon delivery of the headphones to user 50, a second scan of identifier 402 may be received 304 by transaction process 10 when, e.g., user 50 signs for the delivery. Upon receipt 304 of the second scan of identifier 402, transaction process 10 may then process 306 the financial transaction, thereby charging user 50 for the cost of mailing the headphones (e.g., as opposed to user 52).

Some implementations may enable identifier 402 to be associated 302 with more than one financial transaction (for more than one user) at a time. For instance, assume for example purposes only that a letter is being sent by, e.g., user 50 and user 48, and they would like to split the cost of mailing envelope 400. In this example, each user may scan identifier 402 (e.g., with different client electronic devices), resulting in two scans that may be received 300 by transaction process 10. Further, transaction process 10 may associate 302 identifier 402 with each respective user's financial institution account as noted above, such that when transaction process 10 processes 306 the financial transaction, the cost of mailing envelope 400 is split evenly (or as evenly as possible; additionally/alternatively, each user may enter an amount that each desires to pay via the above-noted user interface 700).

Such an implementation may be beneficial in many various situations, for example, where multiple users wish to split a bar tab, restaurant bill, rent, utilities, transportation, etc. In some implementations, as noted above, user 50 may (e.g., via user interface 700 of client application 26) input the amount (e.g., percentage, number, etc.) that user 50 would like to be responsible for paying when the financial transaction is processed 306. As a more specific example, such as the restaurant bill example, identifier 402 may be combined with a bill (e.g., restaurant bill 500) or a receipt. Continuing with the restaurant bill example, scanning identifier 402 on restaurant bill 500 may (e.g., via transaction process 10 and/or client application 26) render at least some of the contents of restaurant bill 500 on at least client electronic device 42 (e.g., via a display) (not shown). This may enable user 50 (e.g., via transaction process 10 and/or client application 26) to select which items user 50 would like to pay for in the financial transaction. This may, for example, obviate the need for the server to split up the items.

In some implementations, the scan received 300 from user 50 (e.g., via client application 26) may be the first scan of identifier 402, and the scan received 304 from user 48 (e.g., via client application 24) may be the second scan of identifier 402. For example, the first scan of identifier 402 from user 50 may be such that user 50 wants to pay 40% of restaurant bill 500, leaving 60% remaining for user 48. In this example, the second scan of identifier 402 received 304 from user 48 may cause transaction process 10 to process 306 the financial transaction for user 50 to pay for 40% of restaurant bill 500 and/or user 48 to pay for 60% of restaurant bill 500. This is not intended to be a limitation of the present disclosure however, as in some implementations, receiving the scan of identifier 402 from user 50 may cause transaction process 10 to process 306 payment by user 50 before the scan by user 48 is received.

In some implementations (similar to the example described with respect to restaurant bill 500), each individual item on the menu may be associated with an identifier, such that user 50 scanning the appropriate identifier adds the cost of that menu item to the financial transaction to be processed 306 by transaction process 10, as well as in some implementations, to send the items to a cook for preparation. In this example, the items sent to the cook may also identify who ordered the item (e.g., by name, table, etc.), whether the food was delivered to the table, as well as any other special instructions associated with the order that may be entered by, e.g., user 50 (e.g., no onions), e.g., via the above-noted user interface 700. Additionally, e.g., when ordering alcoholic beverages, transaction process 10 (e.g., via client electronic device 26) may automatically perform an age verification process to ensure user 50 is of legal age to purchase such a beverage.

Other implementations also exist. As another example, assume that user 50 is grocery shopping. In this example, user 50 may scan (e.g., four) items (each with their own respectively unique identifier), such that those four items are added to the cost of the financial transaction to be processed 306 by transaction process 10. More specifically, the unique identifier may be associated with all of the same items (e.g., Brand X Canned Corn), and/or may be associated with an individual can of canned corn. This may, e.g., be beneficial for gathering produce restocking information.

Additionally/alternatively, transaction process 10 may gather information pertaining to the items for sales, marketing, or other purposes. For example, transaction process 10 may send targeted ads or coupons for, e.g., corn or other items, to user 50 (e.g., via mail or via client application 26) based upon, at least in part, user 50 scanning the identifier (not shown) of canned corn and/or including the cost of the canned corn in the financial transaction. Transaction process 10 may also enable user 50 to opt-out of such information gathering.

As noted above, identifier 402 may be associated 302 with more than one financial transaction at a time. For instance, assume for example purposes only that an item is being sold on a television (e.g., smartTV; not shown) and identifier 402 appears on the TV display. In the example, user 48 and user 50 may each scan identifier 402 (e.g., with different client electronic devices), resulting in two scans that may be received 300 by transaction process 10. Further, transaction process 10 may associate 302 identifier 402 with each respective user's financial institution account as noted above, such that when transaction process 10 processes 306 the financial transaction, the cost of purchasing the item may be processed for each user separately (e.g., each user may pay full price and purchase the item themselves).

In some implementations, as noted above, identifier 402 may be uniquely (e.g., exclusively) associated 302 with user 50, such that the identifier that appears on the TV display for user 50 is different than the identifier that appears on the TV display for user 48. That is, the above-example may be used, e.g., to bid on an item during a TV auction, where each user's scan may constitute the next bid. The increase in bid amount may be, e.g., entered manually by user 50 and/or may be pre-determined as an automatic increased amount. A preset maximum bidding amount may be used by transaction process 10 (and/or client application 26) such that scanning identifier 402 does not constitute the next bid if the next bid amount would be greater than the preset maximum bidding amount.

In some implementations, the validity of the financial transaction may be authenticated 312 by transaction process 10. For instance, the validity of the financial transaction may be authenticated 312 before transferring 310 the cost of mailing envelope 400 to the acquirer account and/or to the account of the financial institution of the post office. For example, authenticating 312 the validity of the financial transaction may include ensuring that user 50 (and/or someone else authorized to act on behalf of user 50) is the person (or entity) authorized to start, e.g., the first scan of identifier 402 (e.g., via client application 26) or authorized to commence any other activities that may result in processing 306 of the financial transaction by transaction process 10.

In some implementations, authenticating 312 validity of the financial transaction may include transaction process 10 verifying 314 whether the first scan of identifier 402 matches the second scan of identifier 402. For instance, assume for example purposes only that the first scan of identifier 402 is received 300 by transaction process 10 executing on computer 12 and stored, e.g., in the above-noted data store. Further assume that a different envelope (not shown) mailed by a different user includes a different identifier than identifier 402, and that a scan of the different identifier is received by transaction process 10. In this example, transaction process 10 may compare the first scan of identifier 402 (e.g., received 300 from client electronic device 42 and stored in the above-noted data store) with the second scan of the different identifier. Because the first scan of identifier 402 may not match the second scan of the different identifier, transaction process 10 may not authenticate 312 the validity of the financial transaction and therefore may prevent processing 306 from initiating, continuing, and/or completing (e.g., at least for one user).

Conversely, assuming for example purposes only that envelope 400 is eventually scanned and received by transaction process 10, transaction process 10 may compare the first scan of identifier 402 with the second scan of identifier 402. Based upon, at least in part, the first scan of identifier 402 matching the second scan of identifier 402, transaction process 10 may authenticate 312 the validity of the financial transaction and may initiate, continue, or complete processing 306.

In some implementations, the first scan may not need to be received 300 by transaction process 10 to process 306 each financial transaction. For example, as noted above, identifier 402 may include a signature (e.g., handwritten or otherwise). In this example, transaction process 10 may receive 300 a first scan of the signature of user 50 as a template from which to compare other signatures.

More specifically, assume for example purposes only that the first scan of the signature of user 50 is received 300 and stored in the above-noted data store. In this example, a different user may attempt to forge the signature of user 50 to obtain free postage. Thus, transaction process 10 may compare the first scan of the signature of user 50 with the second scan of the forgery. If the two signatures do not match (e.g., within some threshold difference), transaction process 10 may not authenticate 312 the validity of the financial transaction, and may prevent processing 306 from initiating, continuing, and/or completing.

Conversely, if the two signatures do match (e.g., within some threshold difference), transaction process 10 may authenticate 312 the validity of the financial transaction and may initiate, continue, or complete processing 306 of the financial transaction. Thus, in some implementations, user 50 may simply sign each envelope without sending (e.g., via client application 26) a scan of each envelope's signature to transaction process 10. Additionally/alternatively, the above example may apply equally to, e.g., other identifiers such as a QR code, such that a QR code exclusive to user 50 may be received as a template, and user 50 may simply use the exclusive QR code on each envelope without sending (e.g., via client application 26) a scan of each envelope's QR code to transaction process 10. This may also include the transmission of one or more QR codes to transaction process 10 together as a "package" of QR codes.

In some implementations, authenticating 312 validity of the financial transaction may include transaction process 10 sending 316 a notification to a user identifying the financial transaction. For instance, after at least one of the first and second scans is either captured (e.g., by client application 26) and/or received 300/304 by transaction process 10, transaction process 10 may send 316 a notification (e.g., mail, email, push notification, text message, telephone message/call, etc.) to user 50 (e.g., via client electronic device 42) indicating, e.g., that the scan has occurred and/or that a financial transaction is pending (or has occurred). In some implementations, the notification may include at least a portion of the information from user interface 700, e.g., to help identify the transaction from other transactions. Moreover, transaction process 10 may send 316 the notification to user 50 at other times without departing from the scope of the disclosure. Such a notification may be used, e.g., for record keeping, to alert user 50 to the attempted financial transaction, or other uses without departing from the scope of the present disclosure.

In some implementations, authenticating 312 validity of the financial transaction may include transaction process 10 receiving 318 a user-based confirmation. For example, to enable scanning (e.g., the first scan) of identifier 402, transaction process 10 may require that user 50 (e.g., via client application 26) log in with a username and/or a password (e.g., a pin). In this example, client application 26 may send a notification to transaction process 10 that the password was entered successfully to authenticate 312 the validity of the financial transaction.

Other examples of a user-based confirmation may also be used without departing from the scope of the disclosure. For example, user 50 may reply to the above-noted email notification, and/or may receive a phone call (e.g., from the financial institution of user 50) to verify the financial transaction. In some implementations, the user-based confirmation may be requested and/or received 318 anytime before and/or after the first scan. For example, before the financial transaction is processed 306, user 50 may be required to reply to the above-noted email confirmation. As another example, for instance, in the above example where user 52 is utilizing identifier 402 allegedly with permission from user 50 when mailing the headphones, the user-based confirmation may be requested and/or received 318 by user 50 after the second scan is received 304. As another example, the user-based confirmation may be requested and/or received 318 by user 52 after the second scan is received 304. In some implementations, the user-based confirmation by user 52 may include, e.g., a pin sent from user 50 (e.g., via client application 26) to be entered by user 52 (e.g., via client application 28).

While one or more implementations may be described using examples of "financial" transactions, transaction process 10 may be used for other types of transactions or events without departing from the scope of the disclosure. For example, identifier 402 may be combined and associated 302 with the transaction or event of issuing and/or filling pharmacy prescriptions, e.g., to help prevent forged prescriptions and maintain more accurate records of issued and/or filled prescriptions. In this example, the first scan of identifier 402 on the prescription may be required, e.g., by a doctor (e.g., when issuing the prescription) to be received 300 (e.g., by a computing device of a pharmacy) before a pharmacy (including, but not limited to, mail-order pharmacies) may be authorized to fill the prescription and/or before the pharmacy may accept payment for the prescription (including, e.g., alerting an insurance company as to the transaction or event for rendering payment (or reimbursement)).

Continuing with the above-stated example, identifier 402 (which may include an Rx number for the prescription) may be associated 302 with an object (e.g., the prescription), and/or any transaction/event (e.g., paying for the prescription, legitimizing, issuing and/or filling the prescription, etc.). More specifically, a scan of identifier 402 may be received 300/304 by transaction process 10, thereby causing transaction process 10 to process 306 the above-noted transaction/event. In some implementations, identifier 402 may be combined with the prescription bottle, where, e.g., a scan of identifier 402 received 300/304, e.g., by a pharmacy computing device (not shown), transaction process 10 may process 306, e.g., the above-noted transaction/event and/or the transaction/event of refilling the prescription (e.g., if the prescription has refills available). This may be similar to the result of a user "calling in" to refill the prescription by phoning the pharmacy and providing the Rx number.

As another non-limiting example such as issuing a ticket (e.g., speeding ticket, parking ticket, etc.), a first scan may be received 300 at a first computing device, e.g., of a police station, e.g., from a "meter maid" with, e.g., a second computing device. Upon doing so, transaction process 10 may associate 302 identifier 402 with an object (e.g., the parking ticket, an illegally parked vehicle or registration of the illegally parked vehicle, etc.) and/or any transaction/event (e.g., paying for the parking ticket, issuing the parking ticket, etc.). Further, a second scan of identifier 402 may be received 304 from, e.g., the owner of the vehicle, thereby causing transaction process 10 to process 306 the above-noted transaction/event.

As an additional example, such as paying for parking, a first scan may be received 300 at a computing device, e.g., a parking meter, e.g., from the user parking the vehicle. Transaction process 10 may then associate 302 identifier 402 with an object (e.g., the parking meter, the parking meter receipt that may show the time when the parking receipt is valid, the parked vehicle or registration of the parked vehicle, etc.) and/or any transaction/event (e.g., paying for the parking receipt as discussed above (or paying for the meter itself where no parking receipts are issued)), renewing the parking receipt, issuing the parking receipt, sending an alert to a user when the meter expires, etc.). Further, a second scan of identifier 402 may be received 304 from, e.g., the owner of the vehicle, at the parking meter or via the receipt, thereby causing transaction process 10 to process 306 the above-noted transaction/event. This is not intended to be a limitation of the present disclosure, however, as in some implementations, an expired parking meter may result in issuing the above-noted parking ticket by, e.g., the meter maid scanning identifier 402 (e.g., on the meter and/or parking receipt similarly as described above). Accordingly, the "financial" transaction may, but need not, exclude other transaction/event types.

In another non-limiting example, identifier 402 may be combined with a "financial instrument" (e.g., check, traveler's check, credit card, debit card, pre-paid and/or refillable card, cash, "money grams", bank deposit/withdrawal slips, and the like). For example, and prior to being put into circulation, e.g., by the Federal Reserve, a first scan of identifier 402 (e.g., printed on cash such as a dollar bill) may be required, e.g., by the U.S. Treasury Department, which may be responsible for printing the currency. To authenticate 312 the validity of the dollar bill, a user may scan identifier 402 (e.g., the second scan) on the dollar bill, which may send a request, e.g., to the U.S. Treasury Department, to provide verification of the dollar bill's circulation. In some implementations, a data store containing all first scanned identifiers may be searched in response to the second scan. This may reduce counterfeiting of the currency, and may assist in the tracking of the dollar bill. Other verification techniques may also be used without departing from the scope of the disclosure.

In some implementations, the first scan of identifier 402 (e.g., on check 600) may be required to make it eligible for being deposited or cashed. This may obviate the need for using routing and account numbers on checks. For instance, scanning identifier 402 may (e.g., via client application 26 and/or transaction process 10) cause transaction process 10 to associate 302 identifier 402 with, e.g., routing/account numbers, the check amount, the person to whom check 600 is made out, the date of check 600, and/or other information typically printed on a check that may be used to effectuate a financial transaction. Such information may be stored and/or later accessed by transaction process 10 in the above-noted data store, e.g., for security purposes and/or to effectuate the financial transaction. The information may also be manually written to check 600 for convenience.

Additionally/alternatively, each identifier 402 may, but need not, differ from check to check. The data encoded within identifier 402 (or identifier 402 itself) may also be encrypted using, e.g., a data encryption standard (DES) algorithm for added security. Moreover, the location where the information may be stored and/or accessed to effectuate a financial transaction may be identified, at least in part, by identifier 402. Other well-known techniques for identifying the location where the information may be stored (and/or accessed) may also be used without departing from the scope of the disclosure. For example, the second scan of identifier 402 may cause, e.g., transaction process 10, to read the associated information (e.g., from the above-noted data store) to effectuate the appropriate financial transaction.

In still further implementations, an ATM (not shown) may be the client electronic device performing the second scan (via transaction process 10) and/or by, e.g., a scanning device used by a person behind a teller counter. Thus, in some implementations, e.g., when using payment via an electronic check, the above example may still apply, wherein identifier 402 may be rendered on a display of a computing device for scanning in addition to (or in place of) the bank account information received 300/304 to make the electronic check eligible for being used as a payment method. This may, e.g., reduce the chance that bank account information is discovered by computer hackers, since identifier 402 may replace the need to manually enter such bank account information. However, identifier 402 may be rendered on a computing device display (e.g., to be scanned) for use with any of the examples discussed throughout without departing from the scope of this disclosure.

As another example, a scan of identifier 402 (e.g., on a pre-paid and/or refillable "card" made from any material, such as plastic, paper, etc.) may be received 300/304 from user 50, where transaction process 10 may associate 302 the bank account of user 50 with identifier 402 (and the card). In some implementations, the card may be printed by a printer of user 50 and need not be obtained from a store. For example, user 50 (or another user) may, e.g., via transaction process 10, activate, fill, or refill the card with money from the bank account of user 50 (e.g., process 306 the financial transaction), e.g., by transaction process 10 receiving 300/304 a scan of identifier 402 as discussed above. The amount to put on the card may be entered (e.g., manually) by user 50 (e.g., via user interface 700 of client application 26) and/or automatically (e.g., via transaction process 10). In some implementations, receiving 304 the second scan (e.g., when using the card to purchase something) may cause transaction process 10 to process 306 the activation, filling, or refilling of the card. This may, e.g., obviate the need for user 50 to carry around means of payment such as cash and credit cards.

In some implementations, transaction process 10 may be used to "pre-withdraw" cash from an ATM. For instance, assume for example purposes only that, e.g., a debit card, of user 50 includes identifier 402 (and may replace card number information). Transaction process 10 may receive 300 a scan of identifier 402 (e.g., via client electronic application 26) and associate 302 the identifier with the financial transaction of withdrawing cash from the ATM. In some implementations, identifier 402 may be located, e.g., on the ATM itself. Additionally/alternatively, associating 302 identifier 402 with the financial transaction may include transaction process 10 associating 302 information (e.g., ATM pin, amount of money (to withdraw, transfer, deposit, etc.)) at the ATM. The information may be entered (e.g., manually) by user 50 (e.g., via client application 26) and/or automatically (e.g., via transaction process 10 as noted above), e.g., as default values in response to the scan. In this example, the second scan of identifier 302 (e.g., from the debit card), may be scanned by the ATM when being inserted into the ATM, which may cause transaction process 10 to process 306 the above-noted financial transaction and, e.g., (physically and/or electronically) transfer 310 an amount of money via the ATM to user 50. This may, e.g., result in fewer lines accruing at ATMs, as well as reduce the chances that someone sees the pin being entered at the ATM. In some implementations, computing devices other than an ATM (e.g., a vending machine) may similarly be used to purchase an item from the vending machine.

In some implementations, more than one identifier may be combined with, e.g., envelope 400. For instance, assume for example purposes only that envelope 400 includes two identifiers (not shown) that may be associated with one another. Each identifier may, but need not, be the same type of identifier. For example, a first identifier may be that which is first scanned and received 300 by transaction process 10. Transaction process 10 may receive 304 a scan of the second identifier associated with the first identifier, thereby causing transaction process 10 to process 306 the financial transaction. In this example, while there may be two distinct identifiers, both identifiers may be considered as the same identifier. As such, the discussion of a single identifier being scanned more than once should be taken as an example only and not as a limitation on the scope of this disclosure.

Additionally/alternatively, the first and second scan may be received in any order. For example, transaction process 10 may receive 300 the first scan of identifier 402 from the post office (e.g., via computer 12). In this example, the second scan may be received 304 from client electronic device 42. This may be useful, e.g., if a given user wished to utilize, e.g., the post office as a type of escrow agent. That is, assuming that the user wished to, e.g., provide a check to the post office but not have it mailed until receipt of, e.g., a purchased item, transaction process 10 may notify the seller of the item that a letter/check had been acquired by the post office. Then, after notifying the user (buyer) that the purchased item had been mailed, the user (buyer) could scan identifier 402 (e.g., such that transaction process 10 received 300 the first scan of identifier 402) and thereafter effectuate the mailing of the letter/check (e.g., by processing 306 the transaction). Therefore, any particular order of scanning and/or receiving 300/304 identifier 402 should be taken as an example only and not as a limitation on the scope of this disclosure.

Still further, receiving 300/304 a scan of identifier 402 (e.g., sent from one or more of the above-noted computing devices) may, but need not, include identifier 402 (as seen by the human eye). For example, and for ease of illustration, conventional QR codes may be encoded with data (e.g., numeric, alphanumeric, byte/binary, Kanji, etc.). Such data may be determined (e.g., via client application 26) to be sent and received 300/304 by transaction process 10 in place of or in addition to the actual QR code (e.g., as seen by the human eye).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method for use with a financial instrument comprising:
    receiving a first scan of an identifier, the identifier including a visible printed image located on the financial instrument, the first scan received from a first computing device;
    associating the identifier of the financial instrument with an account of a first financial institution to facilitate transfer of an amount of money from the first financial institution to the financial instrument by, at least in part, associating the identifier with a user of the first computing device based upon, at least in part, receiving the first scan of the identifier with the visible printed image located on the financial instrument;
    receiving a second scan of the identifier with the visible printed image located on the financial instrument, the second scan received from a second computing device;
    verifying that the first scan of the identifier with the visible printed image located on the financial instrument matches the second scan of the identifier with the visible printed image located on the financial instrument;
    processing the transfer of the amount of money from the financial instrument to a second financial institution based on, at least in part, receiving the second scan of the identifier with the visible printed image located on the financial instrument and verifying that the first scan of the identifier with the visible printed image located on the financial instrument matches the second scan of the identifier with the visible printed image located on the financial instrument; and
    transferring the amount of money from the financial instrument to the second financial institution, wherein the amount of money is electronically transferred from the financial instrument to the second financial institution.

2. The computer-implemented method of claim 1 wherein the financial instrument includes one or more of a check, a traveler's check, a credit card, an ATM card, a debit card, a pre-paid card, a refillable card, a gift card, and a money gram.

3. The computer-implemented method of claim 1 wherein the identifier includes at least one of a bar code and a QR code.

4. The computer-implemented method of claim 1 further comprising:
    receiving a third scan of the identifier with the visible printed image located on the financial instrument, the third scan received from one or more of the second computing device and a third computing device; and
    transferring a second amount of money from the first financial institution to the financial instrument based on, at least in part, receiving the third scan of the identifier with the visible printed image located on the financial instrument.

5. The computer-implemented method of claim 1 wherein the financial instrument does not include a visible printed image of account number information for the financial instrument.

6. The computer-implemented method of claim 1 further comprising:
    receiving a first scan of a second identifier, the second identifier including a second visible printed image located on the financial instrument; and
    disassociating the identifier from the user based on, at least in part, receiving the first scan of the second identifier.

7. The computer-implemented method of claim 1 further comprising:
    receiving a second scan of a second identifier, the second identifier including a second visible printed image located on the financial instrument; and
    activating the financial instrument based on, at least in part, receiving the second scan of the second identifier.

8. A computing system for use with a financial instrument comprising including a processor and a memory configured to perform operations comprising:
    receiving a first scan of an identifier, the identifier including a visible printed image located on the financial instrument, the first scan received from a first computing device;
    associating the identifier of the financial instrument with an account of a first financial institution to facilitate transfer of an amount of money from the first financial institution to the financial instrument by, at least in part, associating the identifier with a user of the first computing device based upon, at least in part, receiving the first scan of the identifier with the visible printed image located on the financial instrument;
    receiving a second scan of the identifier with the visible printed image located on the financial instrument, the second scan received from a second computing device;
    verifying that the first scan of the identifier with the visible printed image located on the financial instrument matches the second scan of the identifier with the visible printed image located on the financial instrument;
    processing the transfer of the amount of money from the financial instrument to a second financial institution based on, at least in part, receiving the second scan of the identifier with the visible printed image located on the financial instrument and verifying that the first scan of the identifier with the visible printed image located on the financial instrument matches the second scan of the identifier with the visible printed image located on the financial instrument; and
    transferring the amount of money from the financial instrument to the second financial institution, wherein the amount of money is electronically transferred from the financial instrument to the second financial institution.

9. The computing system of claim 8 wherein the financial instrument includes one or more of a check, a traveler's check, a credit card, an ATM card, a debit card, a pre-paid card, a refillable card, a gift card, and a money gram.

10. The computing system of claim 8 wherein the identifier includes at least one of a bar code and a QR code.

11. The computing system of claim 8 further comprising:
    receiving a third scan of the identifier with the visible printed image located on the financial instrument, the third scan received from one or more of the second computing device and a third computing device; and transferring a second amount of money from the first financial institution to the financial instrument based on, at least in part, receiving the third scan of the identifier with the visible printed image located on the financial instrument.

12. The computing system of claim 11 wherein the financial instrument does not include a visible printed image of account number information for the financial instrument.

13. The computing system of claim 8 wherein the second location is one of an acquirer account, an escrow account, a holding account, and an intermediate account.

14. The computing system of claim 8 further comprising:
receiving a first scan of a second identifier, the second identifier including a second visible printed image located on the financial instrument; and
disassociating the identifier from the user based on, at least in part, receiving the first scan of the second identifier.

15. A computer program product residing on a non-transitory computer readable storage medium having a plurality of instructions stored thereon which, when executed across one or more processors, causes at least a portion of the one or more processors to perform operations for use with a financial instrument comprising:
receiving a first scan of an identifier, the identifier including a visible printed image located on the financial instrument, the first scan received from a first computing device;
associating the identifier of the financial instrument with an account of a first financial institution to facilitate transfer of an amount of money from the first financial institution to the financial instrument by, at least in part, associating the identifier with a user of the first computing device based upon, at least in part, receiving the first scan of the identifier with the visible printed image located on the financial instrument;
receiving a second scan of the identifier with the visible printed image located on the financial instrument, the second scan received from a second computing device;
verifying that the first scan of the identifier with the visible printed image located on the financial instrument matches the second scan of the identifier with the visible printed image located on the financial instrument;
processing the transfer of the amount of money from the financial instrument to a second financial institution based on, at least in part, receiving the second scan of the identifier with the visible printed image located on the financial instrument and verifying that the first scan of the identifier with the visible printed image located on the financial instrument matches the second scan of the identifier with the visible printed image located on the financial instrument; and
transferring the amount of money from the financial instrument to the second financial institution, wherein the amount of money is electronically transferred from the financial instrument to the second financial institution.

16. The computer program product of claim 15 wherein the financial instrument includes one or more of a check, a traveler's check, a credit card, an ATM card, a debit card, a pre-paid card, a refillable card, a gift card, and a money gram.

17. The computer program product of claim 15 wherein the identifier includes at least one of a bar code and a QR code.

18. The computer program product of claim 15 further comprising:
receiving a third scan of the identifier with the visible printed image located on the financial instrument, the third scan received from one or more of the second computing device and a third computing device; and
transferring a second amount of money from the first financial institution to the financial instrument based on, at least in part, receiving the third scan of the identifier with the visible printed image located on the financial instrument.

19. The computer program product of claim 15 wherein the financial instrument does not include a visible printed image of account number information for the financial instrument.

20. The computer program product of claim 15 further comprising:
at least one of:
receiving a first scan of a second identifier, the second identifier including a second visible printed image located on the financial instrument and disassociating the identifier from the user based on, at least in part, receiving the first scan of the second identifier, and
receiving a second scan of the second identifier, the second identifier including the second visible printed image located on the financial instrument and activating the financial instrument based on, at least in part, receiving the second scan of the second identifier.

* * * * *